Patented July 3, 1951

2,558,860

UNITED STATES PATENT OFFICE 2,558,860

MANUFACTURE OF GOLF BALLS

George William Tansley Leeson, Frome, Somerset, England, assignor to Wallington Weston & Company Limited, Frome, Somerset, England, a British company No Drawing. Application May 10, 1948, Serial No. 26,242. In Great Britain April 10, 1947

3 Claims. (Cl. 18—55)

This invention relates to improvements in the manufacture of golf balls.

Hitherto modern golf balls have been manufactured in three stages and have comprised three distinct units: (a) the central part consisted of a liquid-filled sack or a solid core; (b) the centre part is wound with rubber thread under tension until the required diameter is attained; (c) a cover of gutta percha or balata is moulded on to the two-piece unit to produce the finished ball. The object of winding the rubber thread on to the core under tension is to obtain a degree of resilience which had not been obtained in a gutta percha ball.

One object of this invention is to simplify and cheapen the manufacture of golf balls without detracting from the resilience: a second object is to dispense with the expensive and troublesome process of winding rubber thread: and a third object is to enable the complete ball or a core for a ball to be cast or moulded in one piece.

This invention consists of a method of manufacturing golf balls which method comprises preparing a rubber mix containing vulcanising agents and fillers and containing also a chemical substance readily decomposable and gas-evolving under heat, moulding the mix in fluid-tight moulds completely filled and closed, and subjecting the closed moulds to the heat and pressure necessary for vulcanisation of the mix.

The composition and charge of the rubber mix may be such as to ensure on moulding in one piece a complete ball of the dimensions and weight prescribed in the rules of golf.

In the case in which it is desired to have a covered ball the composition and charge of the rubber mix is such as to ensure on moulding in one piece a core for a golf ball, after which a cover is moulded on to said core to provide a complete ball of dimensions and weight prescribed in the rules of golf.

The readily-decomposable chemical substance may conveniently be ammonium carbonate.

Considering first the manufacture of a complete ball moulded in one piece, the composition of the rubber mix is so chosen that when the ball mould is completely filled with the rubber mix, the weight of the contents will be that which is required in the finished ball.

The pressure and heat necessary for vulcanisation may be applied in various ways. Thus the ball moulds may be mounted in a steam-heated or electrically-heated press, or the ball moulds may be subjected to the action of steam under pressure in an autoclave or alternatively each mould may be in two metal parts which are separated by an insulating ring and the mould may be mounted so that the two parts are pressed together and the parts themselves form the electrodes to create a high-frequency electric field in the rubber mix which is thus heated by diathermy. On application of the heat the ammonium carbonate or the equivalent readily-decomposable substance begins to decompose, but owing to the fact that the mould is completely filled and tightly closed, the gas which would normally be evolved cannot expand; consequently considerable internal pressure is exerted throughout the mass. After cooling and removal from the mould the finished ball (moulded in one piece) possesses a vey high degree of resilience equal to that of balls manufactured by the wound rubber-thread process, and this high degree of resiliency would remain indefinitely.

Complete golf balls moulded and vulcanised in one piece in accordance with this invention have none of the disadvantages of balls made under the normal winding process; for example (1) they recover their spherical form more rapidly after impact with the club; (2) being uniform, they are perfectly balanced and true in flight; and (3) they are practically indestructible in play.

The following mix has been found to yield a hard, tough, highly-resilient core or complete ball having a rebound, when dropped from a given height on to a firm, hard, surface, of 66% to 75%, and will produce a ball of 1.62 inches diameter weighing a fraction under 1.62 ounces, in accordance with the limits prescribed in the British Rules of Golf.

Mixing

| | Parts |
|---|---|
| High-grade pale crepe rubber, passed 15 times through tightly-closed mill rolls | 100.0 |
| Oleic acid | 5.0 |
| Diphenylguanidine | 0.4 |
| Mercaptobenzothiazole | 0.8 |
| Sulphur | 5.0 |
| Zinc oxide | 17.4 |
| Titanium oxide | 5.0 |
| Magnesium carbonate | 42.6 |
| Light calcined magnesia | 6.0 |
| Ammonium carbonate | 5.0 |

*Vulcanisation.*—Submit for ten minutes to a temperature equivalent to 5 lbs. per square inch saturated steam, then increase the temperature at a unifom rate during a period of ten minutes to a temperature equivalent to 40 lbs. per square inch saturated steam, and maintain at this temperature for 40 minutes. The moulds must be cooled down thoroughly before opening.

While the above mixing is offered as a typical example, the scope of this invention is in no way limited to the ingredients and their respective proportions contained therein, as there exists a wide range of fillers and accelerators employed in the rubber and kindred industries from which, in varying proportions, similar results could be obtained; for example the fillers may include granular cork and wood meal; indeed modifications could be so designed as to produce cores or complete balls of densities varying from those of floating up to any reasonably desired limit, provided always that a gas-evolving ingredient is contained in the mix which, in turn, produces the highly-resilient conditions of a core or complete ball, essential to the success of this invention.

Regarding gas-evolving ingredients, here again there exists in the rubber industry a number in general use, any one of which, if incorporated in the mix, could be employed to produce cores or complete balls having varying degrees of resilience, and these are not excluded from employment in the present invention, but ammonium carbonate has been found in practice to be very suitable owing to the low temperature at which gas commences to evolve, and the very high internal pressure exerted throughout the core or complete ball as the vulcanising temperature is raised, and this in consequence yields a remarkably high degree of resilience in the finished product.

By the use of other and more rapid accelerators than those prescribed in the example mix, times of vulcanisation could be cut down, but bearing in mind that the object aimed at is to provide a hard, tough, highly-resilient, and indestructible (in play) ball, it is not advisable to cure too quickly.

In dealing with the manufacture of golf balls made in accordance with this invention on a mass production basis, the complete mixing should be extruded to the full diameter of the core or complete ball, cut into lengths, trimmed down to correct weights, and preformed in moulds of a suitable diameter in a cold press. The finishing moulds may be of the type usually employed in the production of standard golf balls, but preferably of the single type contained and registered in an outer steel sleeve. These, in turn, can be placed in strong, rectangular frames, each containing five or six moulds closed and held securely in position by the application of a stout bolt at one end.

Large numbers of moulds, say 500 or even 1,000 at a time, may be vulcanised in a steam pan, and on completion of the vulcanising process the moulds may be cooled down very rapidly in water. If a relay of loaded moulds is made ready to replace those withdrawn from the steam pan, a much larger output can be attained with the same number of moulds than would be possible by vulsanisation in steam-heated or electrically-heated presses as the presses would have to be cooled down before the moulds could be removed.

The alternate method of manufacture is to produce a core made in accordance with this invention on to which is moulded a cover of gutta percha or balata or one of the tough and resilient co-polymers or polymerized plastics. The usual types of moulds may be employed and the cover may be introduced in the form of a shell in two halves or the core may be dipped in a solution of the gutta percha, balata or other covering material, a sufficient number of "dips" being given to obtain the required diameter. The moulding is then finished by any of the usual means employed in the manufacture of standard golf balls. The covers referred to in the alternate method of manufacture may be employed in conjunction with a core which is not yet vulcanised but which contains the chemical substance readily decomposable under heat such as ammonium carbonate: the core and the cover may then be moulded and vulcanised in one operation.

The example of the composition and proportions of the mix given above can readily be varied if it is necessary to make a larger ball of the same weight, e. g. a ball of 1.68 inches diameter weighting 1.62 ounces.

Finished balls made under the preferred or alternate process above-described are painted and prepared for the market in the usual manner.

It is to be understood that at the temperatures used for vulcanisation and under normal pressure, the chemical substance which is readily decomposable and gas-evolving under heat, such as ammonium carbonate, would normally convert the rubber into a sponge, but as the mould is completely filled with rubber mix, the gases evolved from the ammonium carbonate have no opportunity of expanding, and the result is that when vulcanisation is completed and the moulded ball or core has cooled down, it is not a sponge, and, if cut open, is found to have no cellular structure visible to the naked eye.

The following is an example of a mix suitable for producing a hard, tough, highly-resilient ball of 1.68 inches diameter weighing a fraction under 1.62 ounces in accordance with the limits prescribed in the American Rules of Golf.

| | Parts |
|---|---|
| High-grade pale crepe rubber, passed 15 times through tightly-closed mill rolls | 100.0 |
| Oleic acid | 5.0 |
| Diphenylguanidine | 0.4 |
| Mercaptobenzothiazole | 0.8 |
| Sulphur | 5.0 |
| Zince oxide | 16.0 |
| Magnesium carbonate | 42.0 |
| Light calcined magnesia | 6.0 |
| Titanium oxide | 7.6 |
| Ammonium carbonate | 5.0 |
| Finely-granulated cork | 15.0 |

I claim:

1. A method of manufacturing golf balls which comprises the steps of establishing a mix containing rubber, vulcanizing agents and fillers together with a chemical substance which is decomposable under the action of heat at atmospheric pressure, subjecting the mixture to heat and pressure in a fluid-tight mould which mould is completely filled with said mix and held closed to cause vulcanization of the mix, and thereafter cooling the filled and closed mould before removal of the vulcanized mass from the mould whereby a hard, tough, highly resilient vulcanized mass is produced which is free from cellular structure visible to the naked eye.

2. A method of manufacturing golf balls as in claim 1 which includes the step of moulding onto said mass a cover to provide a completed golf ball.

3. A method of manufacturing golf balls as in claim 1 wherein the vulcanizing step comprises subjecting said mix filled mould to a temperature equivalent to 5 pounds per square inch saturated steam for ten minutes, subsequently increasing the temperature equivalent of 40 pounds per square inch saturated steam, and maintaining such temperature for approximately forty minutes.

GEORGE WILLIAM TANSLEY LEESON.

REFERENCES CITED

The following references are of record in the file of this patent:

UNITED STATES PATENTS

| Number | Name | Date |
|---|---|---|
| 704,462 | Kempshall | July 8, 1902 |
| 1,227,791 | Huebner | May 29, 1917 |
| 1,369,626 | Cuttitta | Feb. 22, 1921 |
| 1,538,789 | Flemming | May 19, 1925 |
| 2,071,647 | Miller | Feb. 23, 1937 |
| 2,156,508 | Minor | May 2, 1939 |